Patented Mar. 1, 1938

2,109,858

UNITED STATES PATENT OFFICE 2,109,858

DRILLING FLUID FOR COMBATING HEAVING SHALE

George E. Cannon, Houston, Tex., assignor to Standard Oil Development Company, a corporation of Delaware No Drawing. Application June 21, 1935, Serial No. 27,751

5 Claims. (Cl. 255—1)

In the art of drilling wells for oil and gas by the rotary method, it is important that the properties of the mud laden fluid used in such drilling be controlled within definite limits. The mud must have a certain amount of colloidal material present in order that enough clay particles can be maintained in suspension to impart to the mud a high density. At the same time, the colloidal nature of the mud makes it more effective in plastering the walls of the hole to seal off porous formations and also assist in carrying cuttings out of the hole. However, if the mud be too highly colloidal in nature, it becomes too viscous making it difficult to pump the mud and causing the mud to retain the sand and rock particles which should be settled out of the mud after it reaches the surface of the earth.

Muds which have a deficiency of colloidal material are improved by the addition of a highly colloidal clay such as bentonite, while muds that already have an excess of colloidal material may be put in proper condition for drilling by treating with a chemical agent which reduces or masks the colloidal character of the mud.

In some areas, notably the Gulf Coast of Texas and Louisiana, a formation known as heaving shale must be penetrated in certain wells. It is difficult and often impossible to penetrate this formation by ordinary rotary drilling methods and mud fluids. This shale has a tendency to move into the hole, filling up the hole already drilled and often sticking the drilling tools. Although the cause of this action is not thoroughly understood, it is believed due to the hydration of the shale particles by the water in ordinary drilling muds. A heaving shale may be defined as one which in contact with the ordinary drilling mud swells or disintegrates spontaneously so much as to interfere with the drilling operation. It is highly sensitive to water; also, it is highly colloidal.

In accordance with the present invention, the disintegration of a heaving shale is prevented by addition to an ordinary drilling mud of a high concentration of addition or treating agents which when used alone tend to reduce the viscosity and prevent the gelation of the usual clay mud, and in turn adding to the thus treated drilling mud a plasticizer such as bentonite for the purpose of avoiding the deleterious effect of the excess treating agent on the clay in the mud which would otherwise be encountered. The drilling mud which is subjected to this treatment is the ordinary drilling mud customarily used in drilling through the usual earth formations other than heaving shale. Such a drilling mud has the qualities of plasticity which are satisfactory for use in penetrating the usual earth formations. The addition or treating agent is added to the drilling mud in such a quantity that it would flocculate and precipitate the clay of the drilling mud except that sufficient plasticizer is added to prevent the flocculation and precipitation of the clay. At least fifty to one hundred times as high a percentage of treating agent and plasticizer is added as will ordinarily be used in controlling the viscosity and plasticity of the usual drilling mud. The treating agent operates effectively to minimize the heaving shale from heaving into the drill hole. Sufficient treating agent is added to the drilling mud until a concentration of treating agent is present necessary to prevent disintegration of the heaving shale to be penetrated by the drilling fluid. The amount of treating agent necessary can be readily determined by introducing a sample of the heaving shale into an aqueous solution of the treating agent. If the shale disintegrates the concentration of the treating agent is increased and a second piece of shale is added to the solution. This test is repeated until disintegration of the heaving shale no longer occurs to a serious degree. The drilling mud containing the necessary concentration of treating agent to prevent heaving of the heaving shale, as above determined, is then treated with sufficient plasticizer to develop the viscosity required for an efficient drilling mud.

By way of illustration, the addition or treating agent may be an alkaline material and an organic compound containing three or more hydroxyl groups. Such compositions as sodium hydroxide and tannin or sodium hydroxide and sugar are effective treating agents. Alternatively, sodium hydroxide alone or sodium hydroxide and sugar can be used and some of the advantages of the invention will be retained.

The plasticizers may be bentonite or highly plastic clays. Such materials are highly colloidal and will react with any replaceable water present in the drilling mud, thus reducing the chances of this water reacting with the heaving shale formations.

The drilling fluid to be subjected to the above treatment can be a suspension of ordinary clay in sufficient proportions to form a light drilling fluid and containing sufficient alkaline material to render the mud distinctly alkaline. The water is rendered highly alkaline by means of caustic soda, caustic potash, lime or any other alkaline material. The alkali is preferably added as an alkaline solution of an organic compound containing three or more hydroxyl groups. The organic compound may be tannic acid, humic acid, pyrogallic acid, gallic acid, sugar, starch or the like. The organic compounds need not be pure but may be an impure vegetable extract such as that used in the tanning and other industries. Such an extract is made from vegetation rich in tannin by extracting the vegetable matter with a suitable solvent. For example, the following commercial extracts have been found effective:

| | |
|---|---|
| Quebracho | Logwood |
| Archil | Myrabolam |
| Cutch | Oak |
| Divi Divi | Osage |
| Fustic | Orange |
| Gambier | Quercitron |
| Haematine | Redwood |
| Hemlock | Spruce |
| Hypernic | Sumac |

Of these extracts quebracho extract is preferred.

Colloidal material is added which will react with any replaceable water which may be present in the composition, thereby reducing the chances of this water reacting with the shale formations. The colloidal material may be a colloidal clay, such as bentonite or the like. Other colloidal material such as gelatin, agar-agar or the like may be used and some of the advantages of the invention will be retained. Preferably, the mud is prepared by adding the bentonite after the caustic soda and tannic acid have been added. Often the formations penetrated by the drill bit furnish so much colloidal clay that it is unnecessary to add the bentonite to the mud fluid.

In carrying out the invention according to the preferred procedure, a well is being drilled through the ordinary earth formations using the usual drilling mud which comprises an ordinary aqueous clay drilling mud of normal plasticity. The drilling is carried on until the drill arrives at a location near the heaving shale. The drilling mud is thinned down and the treating agent and plasticizer are added to the thinned drilling mud.

The proportions in which the component parts of the drilling fluid are mixed depend upon the density and viscosity required in the drilling fluid, the acidity of the water used in preparing the drilling fluid and the nature of the colloidal material employed. When it is desired to use a high concentration of colloidal material, it is necessary to use more of the alkaline material and the organic material if a low viscosity is to be obtained. By adding the alkaline material and the organic material to the mixing fluid prior to the addition of the colloidal material, it is possible to use higher concentrations of the colloidal material. The effectiveness of the alkaline extract solution may be increased by the addition of a small amount of sodium phosphate. The heaving shale consists of more plastic and less plastic fractions. If the drilling mud is properly treated, the more plastic portions of the heaving shale will come to the top of the well as cuttings. A small portion of the heaving shale goes into the mud. If the drilling mud is not so heavily treated, the more plastic portions of the heaving shale will go into the mud and the mud becomes built up in quantity. In good practice, the plasticizing clay should be more plastic than the heaving shale thereby permitting of over-treating the stabilizing clay sufficiently to prevent attack of the shale by the water of the drilling mud.

By way of specific example, a composition for use with a drilling fluid may comprise:

| | Percent |
|---|---|
| Caustic soda | 1 |
| Quebracho extract (crude tannic acid) by weight | 1 |
| Bentonite in such quantities as to give the desired density and viscosity, for example | 10 |

The concentrations of the various compounds used can best be determined in the field. The proportions of caustic soda, Quebracho extract and bentonite may be varied over a wide range, but the concentration of caustic soda must exceed ⅓ of 1% by weight of the drilling fluid, if the fluid is to be effective in drilling through heaving shale.

The above composition may be added to an ordinary clay in water drilling fluid. In this composition, the water is the suspending medium, the caustic soda and the Quebracho extract render the composition strongly alkaline and minimize the amount of hydration of the heaving shale. The bentonite is the suspended colloidal material which functions to take up any replaceable water which may be present in the composition.

If it becomes necessary to used drilling fluids having a high density, weighting material such as barytes, iron oxide, silica, powdered oyster shells, calcined clay or the like may be used while maintaining the concentration of caustic soda in excess of ⅓ of 1% by weight of the drilling mud.

An example of a drilling fluid prepared in this manner is as follows:

| | Per cent by weight |
|---|---|
| Bentonite | 20 |
| Caustic soda | 2 |
| Quebracho extract | 2 |
| Water | 76 |

The weight of this mixture is 9.5 pounds per gallon and its viscosity is approximately 20 centipoise.

Another composition comprises:

| | Per cent by weight |
|---|---|
| Bentonite | 30 |
| Quebracho extract | 2 |
| Caustic soda | 7 |
| Water | 61 |

The weight of this mixture is 11 pounds per gallon and its viscosity is 10 centipoise.

If it becomes necessary to use drilling fluids having a density greater than 11.5 or 12 pounds per gallon, weighting material as above described can be added to the drilling fluid while maintaining the concentration of caustic soda in excess of ⅓ of 1% by weight of the drilling mud.

The caustic soda and tannic acid are added to the drilling mud in sufficient amounts so that the concentration of caustic soda exceeds ⅓ of 1% of the drilling fluid. The bentonite is present in the drilling mud in sufficient quantity to maintain the suspension notwithstanding the presence of a relatively large quantity of tannic acid or its equivalent. The drilling mud as above prepared comprises a suspension of clay at least of the order of plasticity of the heaving shale and treated to a suitable viscosity and yield point for drilling mud. Sufficient bentonite is present in the drilling mud to render the mud excessively plastic, except that its plasticity is reduced by the addition of the tannic acid or the like plus alkali in such amounts that the resulting drilling fluid does not attack the heaving shale. This drilling mud in its liquid phase has enough caustic and tannin to slow up hydration of the heaving shale. The bentonite functions as a precipitate resistant in the mud and counteracts the effect of the caustic and tannin which in the amounts added would otherwise precipitate the clay in the mud. The heaving shale is protected by a substantial proportion of mud which is more plastic than the mud through which the drill is being passed.

Various changes may be made within the scope of the appended claims in which it is desired to claim all novelty inherent in the invention as broadly as the prior art permits.

I claim:

1. A drilling fluid for heaving shale comprising an aqueous clay drilling mud containing a mixture of caustic alkali and an organic compound selected from the class consisting of vegetable tannin extract, tannic acid, humic acid, pyrogallic acid, gallic acid, quebracho extract, sugar and starch, the caustic alkali being present in the amount of at least 1/3 of 1% by weight based on the total weight of the drilling fluid, and colloidal material in sufficient quantity to substantially prevent the alkali and organic compound from precipitating the clay and functioning further to take up and hold any replaceable water in the mud and substantially prevent hydration of the heaving shale by the water of the drilling mud.

2. A drilling fluid for heaving shale according to claim 1 in which the colloidal material is a highly plastic clay.

3. A drilling fluid for heaving shale according to claim 1 in which the colloidal material is bentonite.

4. A drilling fluid for heaving shale according to claim 1 in which the caustic alkali is caustic soda.

5. The process of drilling through a heaving shale which comprises flushing through the hole during drilling a drilling fluid containing a mixture of caustic alkali and an organic compound selected from the class consisting of vegetable tannin extract, tannic acid, humic acid, pyrogallic acid, gallic acid, quebracho extract, sugar and starch, the caustic alkali being present in the amount of at least 1/3 of 1% by weight based on the total weight of the drilling fluid, and colloidal material in sufficient quantity to substantially prevent the alkali and organic compound from precipitating the clay and functioning further to take up and hold any replaceable water in the mud and substantially prevent hydration of the heaving shale by the water of the drilling mud.

GEORGE E. CANNON.